United States Patent
Ricketts et al.

(10) Patent No.: US 10,271,477 B2
(45) Date of Patent: *Apr. 30, 2019

(54) CROP RESIDUE SPREADER FOR A COMBINE HARVESTER

(71) Applicant: CNH Industrial America LLC, New Holland, PA (US)

(72) Inventors: Jonathan E. Ricketts, Coal Valley, IL (US); Bradley J. Wagner, Shippensburg, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,434

(22) Filed: Jan. 9, 2017

(65) Prior Publication Data
US 2018/0192586 A1    Jul. 12, 2018

(51) Int. Cl.
*A01D 41/12* (2006.01)
*A01F 12/00* (2006.01)

(52) U.S. Cl.
CPC .............................. *A01D 41/1243* (2013.01)

(58) Field of Classification Search
CPC ............ A01D 41/1243; A01D 41/1252; A01D 41/12; A01F 12/40; A01F 12/446; A01F 12/48; A01F 12/444; A01F 17/02; A01F 29/12
USPC ...... 460/49, 79, 111, 112, 59; 239/654, 681, 239/682, 667, 673, 688; 241/186.3
See application file for complete search history.

(56) References Cited

U.S. PATENT DOCUMENTS

| | | | |
|---|---|---|---|
| 4,617,942 A * | 10/1986 | Garner | A01F 12/40 460/112 |
| 4,923,431 A | 5/1990 | Miller et al. | |
| 5,082,186 A * | 1/1992 | Bruns | A01D 41/1243 239/667 |
| 6,113,491 A | 9/2000 | Holmén | |
| 6,343,986 B1 | 2/2002 | Hofer | |
| 6,616,528 B2 | 9/2003 | Wolters et al. | |
| 6,663,485 B2 | 12/2003 | Niermann | |
| 6,736,721 B2 | 5/2004 | Niermann et al. | |
| 7,404,761 B2 | 7/2008 | Dow et al. | |
| 8,118,651 B2 | 2/2012 | Weichholdt et al. | |
| 8,210,915 B2 | 7/2012 | Holmén | |
| 8,939,830 B2 | 1/2015 | Holmén | |

(Continued)

FOREIGN PATENT DOCUMENTS

| | | |
|---|---|---|
| EP | 3108737 A1 | 12/2016 |
| WO | 03071857 A1 | 9/2003 |

OTHER PUBLICATIONS

European Search Report for European Application No. 18150665.0, dated May 2, 2018 (6 pages).

*Primary Examiner* — Robert E Pezzuto
(74) *Attorney, Agent, or Firm* — Peter K. Zacharias

(57) ABSTRACT

A spreader system of an agricultural vehicle for spreading crop residue including a spreader device and a fan. The spreader device includes a plurality of paddles configured to rotate about a first axis, with the rotation of the paddles producing a stream of crop residue. The fan includes a plurality of impellers configured to rotate about a second axis, with the rotation of the impellers producing a stream of air. The stream of air is directed to exit the spreader system beneath the stream of crop residue as the crop residue leaves the spreader device.

20 Claims, 3 Drawing Sheets

(56) References Cited

U.S. PATENT DOCUMENTS

| | | | |
|---|---|---|---|
| 9,730,390 B2* | 8/2017 | Maes | A01D 41/12 |
| 2005/0124399 A1* | 6/2005 | Holmen | A01D 41/1243 |
| | | | 460/111 |
| 2007/0015556 A1* | 1/2007 | Johnson | A01D 41/1243 |
| | | | 460/111 |
| 2014/0158207 A1* | 6/2014 | Rosec | B65G 31/04 |
| | | | 137/1 |

* cited by examiner

CROP RESIDUE SPREADER FOR A COMBINE HARVESTER

FIELD OF THE INVENTION

The present invention relates to agricultural harvesters, such as combine harvesters, and, more specifically to crop residue spreader systems included in such combine harvesters.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

During the process of harvesting in a combine, the desired grain is gathered and saved while crop material other than the desired grain is expelled from the combine. The non-grain crop material or crop residue is usually derived from two areas in the combine, the threshing rotor and the cleaning system. The material expelled from the threshing rotor is generally referred to as straw and includes much of the larger plant material such as stalks, stems, cobs leaves and the like as well as foreign or non-crop material. The material expelled from the cleaning system is generally referred to as chaff and includes much of the finer plant material residue, such as pods, husk fragments and particulates. The combined flows of crop residue to be expelled from the combine can be dealt with in several ways; however, the processes for redepositing the residue material back into the field can be categorized generally as either windrowing or spreading.

In a windrowing process, the crop residue is deposited onto the harvested crop stubble in a continuous narrow stream or windrow, which is much narrower than the harvested swath width. Accumulated in this manner, the windrowed residue material can be picked up easily for baling or other subsequent processing or use.

In a spreading process, a mechanical device distributes the straw and/or chaff evenly across the extent of the combine header cutting width. The material to be spread is usually chopped to a short length so that after spreading the material will break down quickly to add nutrients to the soil and/or to be sufficiently small so as to not interfere with subsequent tilling or seeding operations.

Residue spreaders can be of horizontal and vertical types. A horizontal spreader includes a spreader device with a rotor driven on a generally vertical axis and a plurality of vanes or paddles on the rotor to propel residue in a wide swath behind the combine. Commonly, two such side-by-side rotors are used, the rotors rotating in opposite directions within a housing. After being chopped, the crop residue enters the rotor area through a vertical inlet in the spreader housing, and as the paddles rotate about the axis the residue is propelled towards a tangential outlet of the housing. Typically, the tangential outlet of the housing is formed by a deflector whose orientation and shape determines the spread pattern of the crop residue. It is known to use adjustable structures of the housing and deflector to control the outlet flow of material, by adjusting the size and position of the deflector and of the space between the rotor paddles and the adjustable structures, to achieve a substantially even distribution of the crop residue material across the width of a distribution swath behind the combine. It is desirable to achieve an even distribution of material for more even and consistent residue material breakdown and to facilitate subsequent field tilling and seeding operations.

A vertical spreader includes a rotor driven about a generally horizontal axis and a plurality of vanes or paddles are on the rotor to propel residue from the spreader housing. Again, commonly two such side-by-side rotors are used, rotating in opposite directions.

As combine harvesters increase in size and crop processing capability, the width of the header of the combine can increase in order to make fewer passes in a field. As the width of the header increases, so too must the spread width of crop residue behind the combine in order to uniformly cover the field which now is mostly bare of crops. The spread width can be adjusted, for example, by increasing the rotational speed of the rotors and paddles so the crop material is spread a greater distance from the spreader system. The positioning of the deflector is controlled to prevent, for example, crop residue being spread onto standing crop, which would then be collected and reprocessed by the combine.

One particular problem that arises with greater spread widths is the creation of "stripes" of high and low volumes of crop residue along the driving direction of the combine in hard crop conditions. The stripes of high and low crop residue volumes are an uneven thickness of the crop residue, with higher thickness of the crop residue resulting in a high volume stripe and lower thickness of the crop residue resulting in a low volume stripe. The stripes of crop residue distribution can lead to some areas of the field being practically bare of crop residue, with little added nutrients from the residue, while other areas of the field have excess crop residue that can interfere with seeding and tilling.

What is needed in the art is a crop residue spreader that will uniformly distribute the crop residue across the full cut width of the combine.

SUMMARY OF THE INVENTION

Exemplary embodiments of the present invention provide for the introduction of an air stream beneath an exiting flow of crop residue.

In accordance with an aspect of the present invention, there is provided a spreader system of an agricultural vehicle for spreading crop residue that includes a spreader device and a fan. The spreader device includes a plurality of paddles configured to rotate about a first axis, with the rotation of the paddles producing a stream of crop residue. The fan includes a plurality of impellers configured to rotate about a second axis, with the rotation of the impellers producing a stream of air. The stream of air is directed to exit the spreader system beneath the stream of crop residue as the crop residue leaves the spreader device.

In accordance with another aspect of the present invention, there is provided an agricultural vehicle with a threshing system, a cleaning system and a spreading system. The threshing system provides a first crop residue stream and the cleaning system provides a second crop residue stream to the spreading system. The spreading system includes a spreader device having a plurality of paddles configured to rotate about a first axis, with the rotation of the paddles receiving the first stream of crop residue and/or the second stream of crop residue. The rotating paddles produce an exit stream of crop residue from the incoming streams. The fan has a plurality of impellers configured to rotate about a second axis, with the rotation of the impellers producing a stream of air. The stream of air being directed to exit the spreader system beneath the exit stream of crop residue as the crop residue leaves the spreader device.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw", "chaff" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, or MOG (Material Other than Grain). The word "straw" refers to the stalk of the crop and it may be chopped before distribution on the field. The word "chaff" refers to the material that is removed during the sieve or sifting process and is generally smaller and lighter than the straw. Incompletely threshed crop material is referred to as "tailings". Also the terms "fore", "aft", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
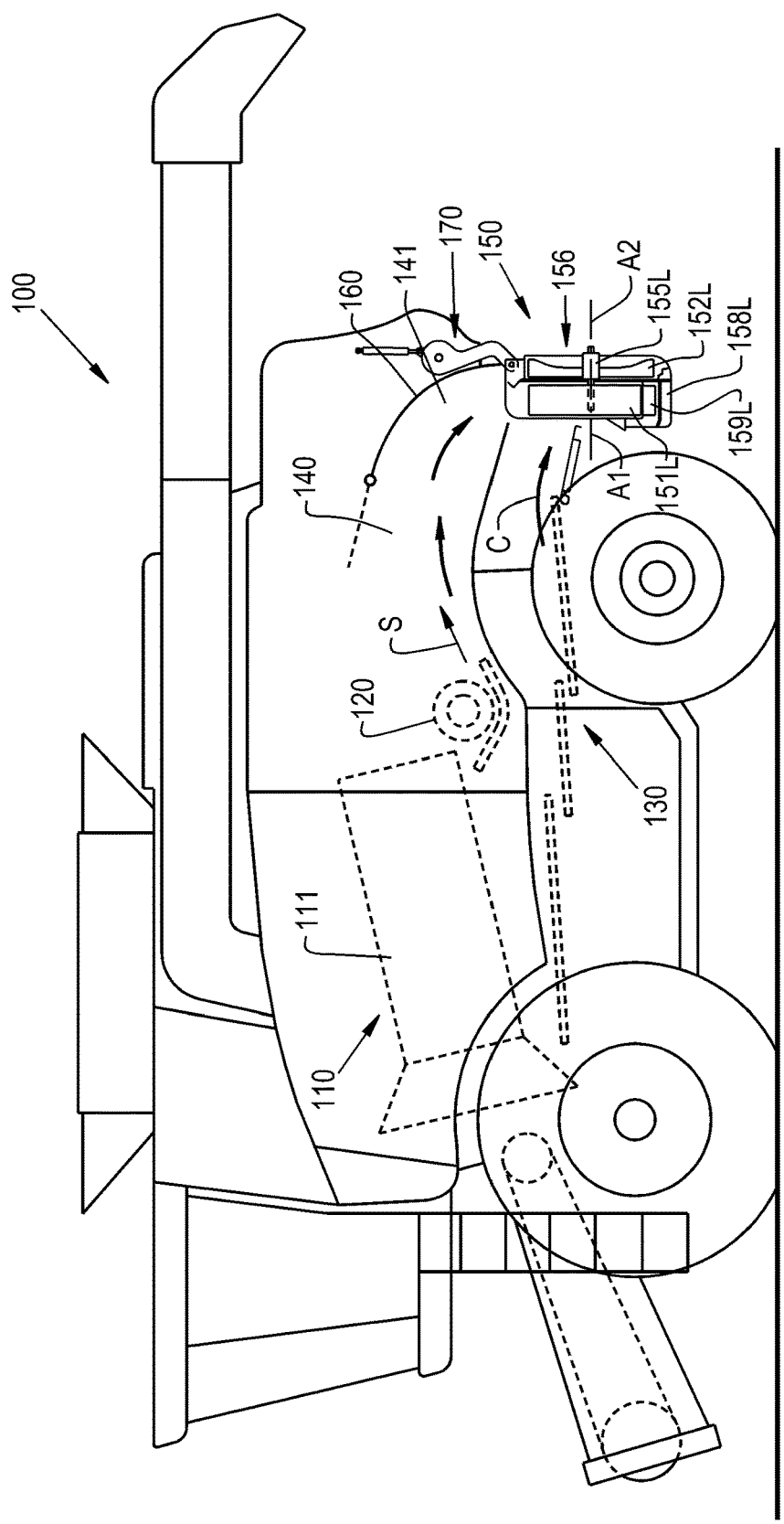
FIG. 1 is a partially sectioned side view of an exemplary embodiment of a harvesting machine with an exemplary embodiment of a spreader system of the present invention, the spreader system including at least one spreader device and a fan.

Referring now to the drawings, and more particularly to FIG. 1, there is shown an exemplary embodiment of an agricultural vehicle 100 in the form of a combine 100 which is representative of a wide variety of agricultural harvesting machines and which generally includes a threshing system 110 having a rotor 111 rotatable in a known manner for separating the desirable crop component or grain from straw, stalks and other plant residue. A beater 120 is rotatable for propelling or directing a flow or stream of the plant residue, generally referred to as straw S, toward the rear of combine 100. A cleaning system 130 receives the threshed crop component from threshing system 110 and removes chaff and other remaining residue such as seedpods, husks and the like, generally referred to as chaff C, and directs a flow or stream of chaff C toward the aft end of combine 100. Straw S passes through a cavity 140 toward a spreader assembly 150 at a lower opening 141 of cavity 140. A pivotal windrow door 160 defines a boundary for the travel of straw S. A The spreader assembly 150 includes a crop residue spreader 151 aligned with an axis A1 and a fan 152 aligned with an axis A2, greater detail of the attributes of spreader assembly 150 are illustrated in subsequent figures. It should be appreciated that while spreader assembly 150 is shown and described herein as a vertical spreader assembly 150, the principles of the present invention can also be applied to spreader assemblies that are oriented differently. As illustrated in FIG. 1, crop residue spreader 151L and fan 152L refer to a left embodiment, with the right embodiments 151R and 152R being illustrated in FIG. 2. When reference is made to either the right or left counterpart it should be understood that one is a mirror image embodiment of the other.

Figure 2:
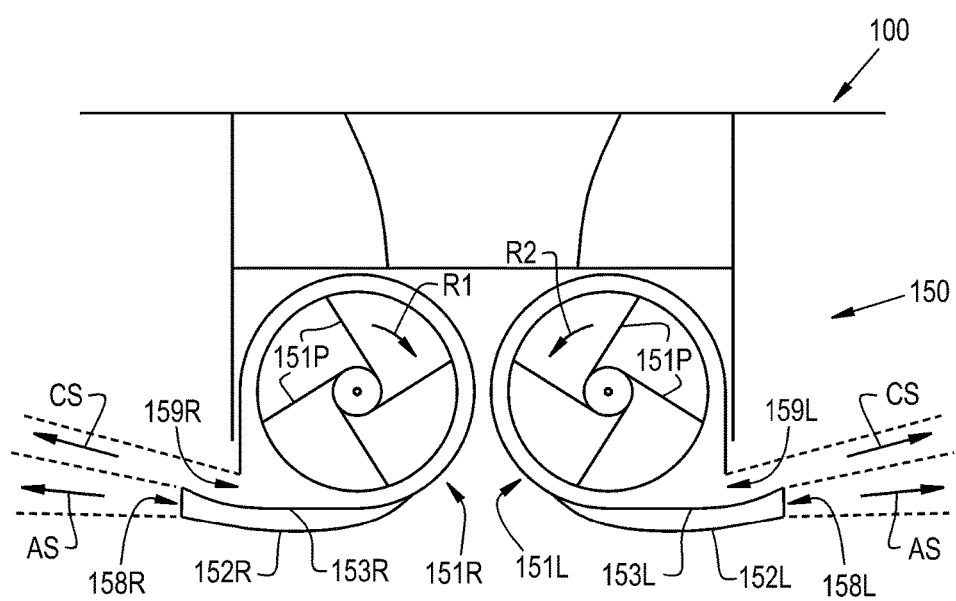
FIG. 2 is a view of the spreader system introduced in FIG. 1 looking aft of the harvesting machine of FIG. 1, in accordance with an exemplary embodiment of the present invention.
Figure 3:
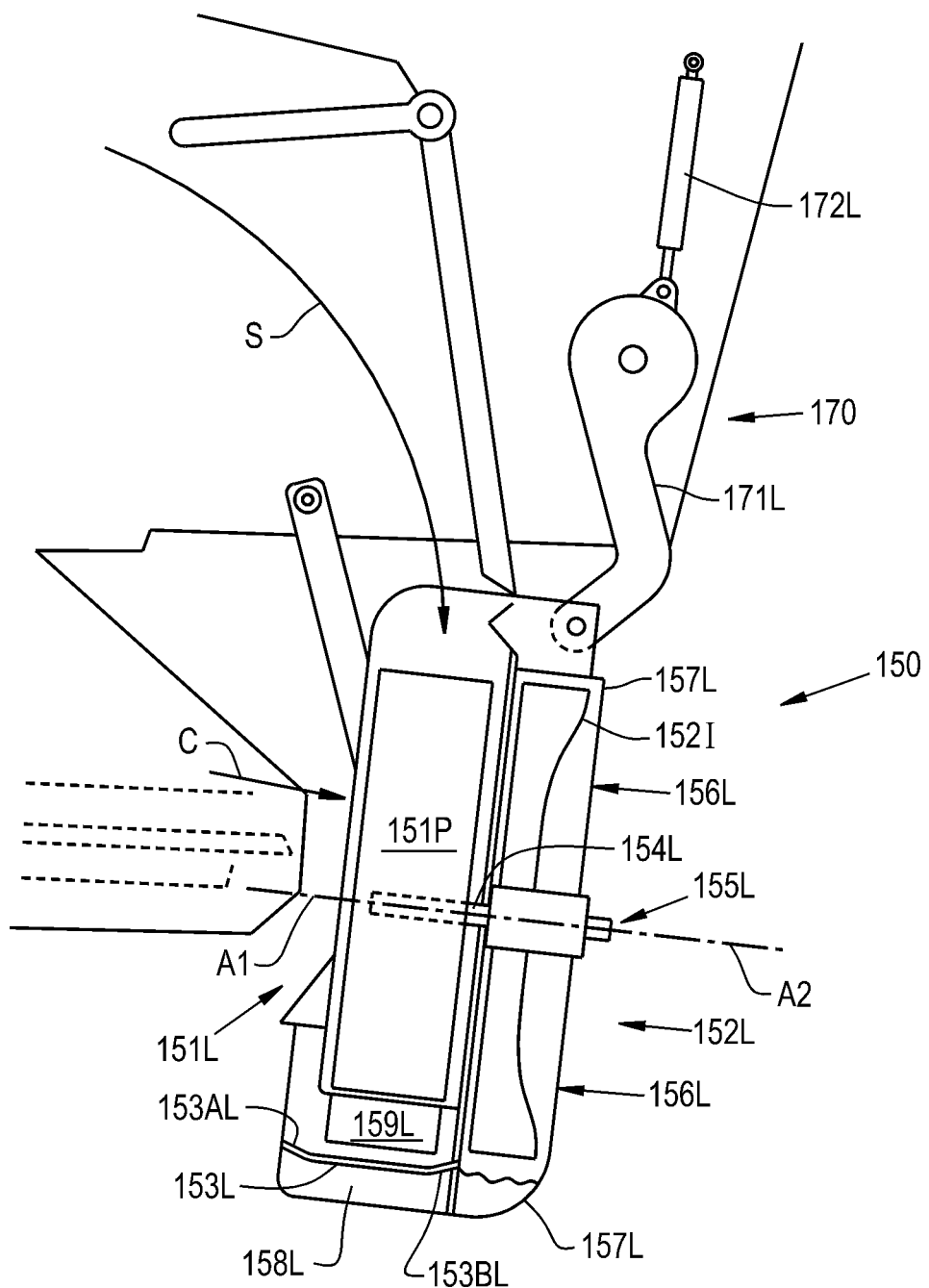
FIG. 3 is a left side view of the spreader system of FIGS. 1 and 2, in accordance with an exemplary embodiment of the present invention.

Referring now also to FIGS. 2 and 3, an exemplary embodiment of spreader assembly 150 is illustrated in FIG. 2 looking to the aft of combine 100 and directly at crop residue spreaders 151L and 151R, and FIG. 3 illustrates the crop residue spreader device 151L and fan 152L viewed from the left side of combine 100. Spreader system 150 includes side-by-side crop residue spreader devices 151L and 151R supported for counter rotation as indicated by arrows R1 and R2, about axes A1 for each device. While fan devices 152L and 152R are located on the far side and are not completely seen in FIG. 2, they are respectively located immediately aft of crop residue spreader devices 151L and 151R, as can be seen in FIG. 3. Divider plates 153R and 153L are respectively shown keeping streams CS of crop residue in spreader devices 151L and 151R from mixing with air streams AS generated by fans 152L and 152R. The straw S and chaff C enter and are accelerated by crop residue spreader devices 151R and 151L and the air stream AS from fan devices 152L and 152R meet as the streams respectively travel beyond the extent of divider plates 153L and 153R, respectively to the left and right of combine 100.

FIGS. 1 and 3 also illustrate a spreader pivoting device 170 arranged to pivot spreader system 150 away from the flows of straw S and chaff C so that a windrow of straw S can be formed on the ground. Spreader pivoting device 170 includes a pivoting arm 171L and an actuator 172L to carry out the movement of spreader system 150, with the actuator being under the control of the operator of combine 100.

Crop residue spreader device 151L includes several paddles 151P. In a like manner fan 152L includes several impellers 152I. Crop residue spreader device 151L rotates about axis A1 and fan 152L rotates about axis A2, each of which are generally horizontal. Axis A1 and axis A2 can be aligned, can be coaxial and can be effectively the same with a common shaft 154L being coupled to both paddles 151P and impellers 152I. A motor 155L is coupled to shaft 154L and is used to drive both crop residue spreader 151L and fan 152L. Motor 155L is a hydraulic motor in an exemplary example, but it is also contemplated that motor 155L may be an electric motor, a pneumatic motor, or other rotational motor.

Air is drawn in through inlet 156L in a direction that is from the aft end of combine 100. Air inlet 156L is arranged to take in air from around axis A2, since inlet 156L is generally open in this axial direction. The air is formed into an air stream AS, which is directed by housing 157L to be parallel and to be beneath a corresponding flow of a crop residue stream CS, with air stream AS and crop residue stream CS being separated by divider plate 153L. As air stream AS moves beyond divider plate 153L, at air outlet 158L, it is beneath crop residue stream CS that has exited from outlet 159L. Air stream AS supports the movement of crop residue stream CS so that the crop residue can be spread to greater distances. This arrangement creates a layer of air for the MOG of the crop residue stream CS to ride on thereby extending the distance to which the MOG is delivered. The velocity of air stream AS may be different than the velocity of crop residue stream CS or the velocities can be approximately the same. The width of air stream AS as it exits outlet 158 may be wider than crop residue stream CS. As some of the MOG of crop residue stream CS mixes in with air stream AS the MOG is pushed to the outside.

Further, air stream AS may be shaped by the shape of outlet 158L. For example, divider plate 153L is shown with angled portions 153AL and 153BL allowing the shape of the air stream AS exiting from outlet 158L to have a trough type shape. This can advantageously acts to keep crop residue stream CS more focused as it travels away from spreader system 150.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A spreader system of an agricultural vehicle for spreading crop residue, comprising:
    a spreader device including a plurality of paddles configured to rotate about a first axis, the rotation of the paddles producing a stream of crop residue; and
    a fan including a plurality of impellers configured to rotate about a second axis, the rotation of the impellers producing a stream of air, the stream of air being directed to exit the spreader system beneath the stream of crop residue as the crop residue leaves the spreader device, the stream of air being kept separate from the stream of crop residue until the streams travel beyond the spreader device.

2. The spreader system of claim 1, wherein the fan is adjacent the spreader device.

3. The spreader system of claim 1, wherein the first axis and the second axis are coaxial.

4. The spreader system of claim 1, further comprising a shaft to which the paddles and impellers are coupled.

5. The spreader system of claim 1, wherein the first axis and the second axis are generally horizontal.

6. The spreader system of claim 1, further comprising a motor powering the fan.

7. The spreader system of claim 6, wherein the motor additionally drives the spreader device.

8. The spreader system of claim 1, further comprising a divider plate positioned below the spreader device having the stream of crop residue above the divider plate and the stream of air beneath the divider plate, the divider plate keeping the stream of air from mixing with the stream of crop residue until the streams travel beyond the spreader device.

9. The spreader system of claim 1, further comprising an air inlet for the fan, the air inlet being generally open toward an aft portion of the agricultural vehicle.

10. The spreader system of claim 9, wherein the air inlet is arranged around the second axis.

11. An agricultural vehicle for harvesting a crop, the vehicle comprising:
    a threshing system producing a first stream of crop residue;
    a cleaning system producing a second stream of crop residue; and
    a spreader system including:
        a spreader device including a plurality of paddles configured to rotate about a first axis, the rotation of the paddles receiving at least one of the first stream of crop residue and the second stream of crop residue, the rotating paddles producing an exit stream of crop residue; and
        a fan including a plurality of impellers configured to rotate about a second axis, the rotation of the impellers producing a stream of air, the stream of air being directed to exit the spreader system beneath the exit stream of crop residue as the crop residue leaves the spreader device, the stream of air being kept separate from the stream of crop residue until the streams travel beyond the spreader device.

12. The agricultural vehicle of claim 11, wherein the fan is adjacent the spreader device.

13. The agricultural vehicle of claim 11, wherein the first axis and the second axis are coaxial.

14. The agricultural vehicle of claim 11, further comprising a shaft to which the paddles and impellers are coupled.

15. The agricultural vehicle of claim 11, wherein the first axis and the second axis are generally horizontal.

16. The agricultural vehicle of claim 11, further comprising a motor powering the fan.

17. The agricultural vehicle of claim 16, wherein the motor additionally drives the spreader device.

18. The agricultural vehicle of claim 11, further comprising a divider plate positioned below the spreader device having the stream of crop residue above the divider plate and the stream of air beneath the divider plate, the divider plate keeping the stream of air from mixing with the stream of crop residue until the streams travel beyond the spreader device.

19. The agricultural vehicle of claim 11, further comprising an air inlet for the fan, the air inlet being generally open toward an aft portion of the agricultural vehicle.

20. The agricultural vehicle of claim 19, wherein the air inlet is arranged around the second axis.

* * * * *